US006195488B1

(12) United States Patent
Song

(10) Patent No.: US 6,195,488 B1
(45) Date of Patent: *Feb. 27, 2001

(54) OPTICAL FIBER COMPOSITE GROUND WIRE AND METHOD USING STEEL TUBE

(75) Inventor: Pil-Soo Song, Kyongsangbuk-do (KR)

(73) Assignee: Samsung Electronics Corporation, Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/442,946

(22) Filed: Nov. 18, 1999

(30) Foreign Application Priority Data

Nov. 18, 1998 (KR) .................................................. 98-49501

(51) Int. Cl.⁷ ....................................................... G02B 6/44
(52) U.S. Cl. ............................ 385/101; 385/107; 385/114
(58) Field of Search ........................................ 385/100–114

(56) References Cited

U.S. PATENT DOCUMENTS

| Re. 32,374 | 3/1987 | Dey et al. . |
| 4,078,853 | 3/1978 | Kempf et al. . |
| 4,359,598 | 11/1982 | Dey et al. . |
| 4,491,386 | 1/1985 | Negishi et al. . |
| 4,491,387 | 1/1985 | Dey et al. . |
| 4,630,887 | 12/1986 | Taylor . |
| 4,666,244 | 5/1987 | Van der Velde et al. . |
| 4,775,213 | 10/1988 | Kitayama . |
| 4,784,461 | 11/1988 | Abe et al. . |
| 4,793,686 | 12/1988 | Saito . |
| 4,865,415 | 9/1989 | Kitayama . |
| 4,944,570 | 7/1990 | Oglesby et al. . |
| 5,131,064 | * 7/1992 | Arroyo et al. ........................ 385/102 |
| 5,195,158 | 3/1993 | Bottoms, Jr. et al. . |
| 5,204,926 | 4/1993 | Bottoms, Jr. et al. . |
| 5,274,725 | 12/1993 | Bottoms, Jr. et al. . |
| 5,495,546 | 2/1996 | Bottoms, Jr. et al. . |
| 5,524,164 | 6/1996 | Hattori et al. . |
| 5,787,217 | 7/1998 | Traut et al. . |
| 6,122,424 | * 9/2000 | Bringuier .............................. 385/109 |

* cited by examiner

Primary Examiner—Hung N. Ngo
(74) Attorney, Agent, or Firm—Robert E. Bushnell, Esq.

(57) ABSTRACT

There is provided an optical fiber composite ground wire (OPGW). The optical fiber composite ground wire (OPGW) includes a central wire at the center of the optical fiber composite ground wire (OPGW), a steel tube disposed around the central wire, at least one optical fiber ribbon inserted into the steel tube and containing a plurality of optical fibers arranged in coplanar alignment, a filling material filled in the steel tube, at least one inner layer wire surrounding the central wire, and at least one outer layer wire surrounding the steel tube and the inner layer wire.

38 Claims, 3 Drawing Sheets

OPTICAL FIBER COMPOSITE GROUND WIRE AND METHOD USING STEEL TUBE

CLAIM OF PRIORITY

This application claims priority to an application entitled *Optical Fiber Composite Ground Wire Using Steel Tube* filed in the Korean Industrial Property Office on Nov. 18, 1998 and assigned Serial No. 98-49501, the contents of which are hereby incorporated by reference.

BACKGROUND OF THE INVENTION

1. Field of the Invention

The present invention relates generally to an optical cable used for transmission of an optical signal, and in particular, to an optical fiber composite ground wire (OPGW) using a steel tube, which functions as both a communication line and a ground wire.

2. Description of the Related Art

Electric lines are divided into an underground line and an aerial line. The aerial line is usually installed in areas other than cities for electric transmission. Due to probable lightening strikes on an electric line, an electric wire is installed as a lightning rod above the electric line. The electric wire is called a ground wire. The electric line, especially an electric transmission line needs a communication line for remote monitoring or remote control. The ground wire and the communication line are separately installed but it is preferable to integrate them.

However, a widely used conductor, such as copper or aluminum, is typically not suitable for the communication line because a nearby power line can generate an induced voltage or current and can thus cause a communication failure. The communication failure increases in proportion to the voltage and current strength of the power line and in inverse proportion to the distance between the communication line and the power line. In particular, an electric transmission line on which a high current flows at hundred thousands of volts, for example, can incur a serious communication failure on a nearby communication line. Nonetheless, a communication line should be provided to an electric transmission line. To overcome this problem, an optical fiber composite ground wire (OPGW) has been explored.

In this regard, an optical fiber composite ground wire (OPGW) using a steel tube exemplary of contemparory practice in the art includes acryl-coated optical fibers having an outer diameter of about 250 $\mu$m, jelly on the circumference of the optical fibers, for protecting the optical fiber against water, a steel tube for inserting at least one optical fiber having the jelly, a central wire, inner layer wires surrounding the central wire and being aluminum-coated steel wires or aluminum wires, and outer layer wires surrounding the inner layer wires and being aluminum-coated steel wires or aluminum wires. In the optical fiber composite ground wire (OPGW) exemplary of contemparory practice in the art, the optical fibers are individually inserted into the steel tube and, thus, can be of different lengths due to application of different tensile forces on the optical fibers in a fabrication process, which can result in deterioration of optical transmission characteristics.

U.S. Pat. No. 4,078,853 to Kempf, et al. entiled *Optical Communication Cable*, disclose an optical communication cable including one or more cores of light-transmitting optical fibers substantially decoupled mechanically from the rest of the cable structure. It is disclosed each core can include linear arrays of optical fibers packaged in a plurality of ribbon structures which are stacked and hellically stranded for further strain-relief.

U.S. Pat. No. 4,359,598 to Dey, et al. entitled *Overhaead Electric Transmission Systems*, disclose a flexible stranded body, such as an electric conductor of an overhead electric transmission or distribution system, including at least one stranded layer of elongate elements of metal or metal alloy, at least one elongate compartment within and extending throughout the length of the stranded body and, loosely housed in the elongate compartment, at least one separate optical fibre and/or at least one optical bundle.

U.S. Pat. No. 4,491,386 to Negishi, et al. entitled *Optical Fiber Cable And Process For Production Thereof*, disclose an optical fiber cable including a linear center member having at least one longitudinal and spiral groove in the surface thereof, one coated optical fiber received in each groove, an outer sheath that encloses the center member, and a jelly-like material with which the space around each optical fiber is entirely filled.

U.S. Pat. No. 4,491,387 to Dey, et al. entitled *Overhead Electric And Optical Transmission Systems,* disclose a flexible stranded body, such as an electric conductor of an overhead electric transmission or distribution system, which includes at least one stranded layer of elongate elements of metal or metal alloy, at least one elongate compartment within and extending thoughout the length of the stranded body and, loosely housed on the elongate compartment, at least one separate optical fibre and/or at least one optical bundle.

U.S. Pat. No. 4,944,570 to Oglesby, et al. entitled *Fiber Optic Cable Having An Extended Elongation Window*, disclose a fiber optic cable including a central core which has one or more helical channels in its periphery. It is disclosed one or more tubes containing a dielectric water-blocking compound and one or more optical fibers are positioned in the channels. It is disclosed the fibers are randomly arranged within the tubes in such a way that tensile stresses on the cable are not transmitted to them, thus providing an elongation window. It is disclosed the assembly formed by the core and the tube or tubes is wrapped with a serving of metal wires.

U.S. Pat. No. 4,630,887 to Taylor entitled *Optical Fiber Ribbon Structure,* discloses an optical fibre ribbon structure suitable for use in an optical cable or other application where there is a risk that optical fibres will be subjected to a tensile force and includes a plurality of optical fibres and flexible reinforcing elements of resilient material arranged side by side and embedded in an elongate plastics body.

U.S. Pat. No. 4,666,244 to Van der Velde, et al. entitled *Flat Type Optical Cable And An Optical Cable Composed Of Several Flat Type Cables,* disclose a flat type optical cable including parallelly extending optical fibers which are interconnected by a light-cured lacquer of acrylic acid esters. It is disclosed the lacquer is present only on the facing circumferential parts of the optical fibers.

U.S. Pat. No. 4,775,213 to Kitayama entitled *Composite Overhead Stranded Conductor Having A Filler Between Optical Fibers And A Protective Tube,* disclose a composite stranded conductor bundle in which one of the cable strands is a fiber optic unit having a protective tube enclosing a plurality of optical fibers. It is disclosed the protective tube is filled with a fiber filler to hold the optical fibers.

U.S. Pat. No. 4,784,461 to Abe, et al. entitled *Optical Cable With Improved Strength*, disclose an optical cable having a central core with grooves along the outside, the grooves housing tubes containing optical fibers. It is disclosed the structure also allows for a different water blocking material to be used within the tubes than outside the tubes and within the grooves so as to satisfy different property requirements.

U.S. Pat. No. 4,793,686 to Saito entitled *Optical Fiber Composite Overhead Transmission Line And Method For Producing Same,* discloses an optical fiber composite overhead transmission line that includes a spacer formed with spiral grooves filled with a jelly-like material into which optical fibers are buried. It is disclosed a cover or sheath surrounds the spacer member to protect the internal components.

U.S. Pat. No. 4,865,415 to Kitayama entitled *Composite Fiber-Optic Overhead ground wire,* disclsoes a composite fiber-optic overhead ground wire having an optical unit which includes an optical fiber protecting tube, a spacer having helical grooves formed in its outer periphery, and multiple optical fiber units accommodated in the grooves of the spacer.

U.S. Pat. No. 5,195,158 to Bottoms, et al. entitled *Tight Buffered Fiber Optic Groundwire Cable,* disclose a fiber optic groundwire or static cable for use between spaced-apart support towers of an electrical power transmission network, for ground fault protection from lightning strikes and other electrical faults, with an integral fiber optic telecommunications bundle. It is disclosed a bundle of optical fibers tightly enclosed by a pliable thremally insulating strain jacket is firmly affixed into a helically-wound channel within an electrically conductive core, and at least one layer of stranded electrical conductors serving as strength members completely surrounds the core.

U.S. Pat. No. 5,204,926 to Bottoms, Jr., et al. entitled *Tight Buffered Fiber Optic Groundwire Cable,* disclose a fiber optic groundwire or static cable for use between spaced-apart support towers of an electric power transmission network, for ground fault protection from lightning strikes and other electrical faults, with an integral fiber optic telecommunications bundle. It is disclosed a bundle of optical fibers tightly enclosed by a pliable thermally insulating strain jacket is firmly affixed into a helically-wound channel within an electrically conductive core, and at least one layer of stranded electrical conductors serving as strength members completely surrounds the core. It is disclosed the wire can include at least one fiber optic subunit firmly affixed into a helically-wound channel within an electrically conductive core of the cable. It is disclosed the fiber optic subunit includes a plurality of optical fibers wound about a fiberglass central strength member having an overcoating layer of a pliable semicompressible material, and tightly enclosed by a pliable thermally insulating strain jacket.

U.S. Pat. No. 5,274,725 to Bottoms, et al. entitled *Tight Buffered Fiber Optic Groundwire Cable,* disclose a fiber optic groundwire or static cable for use between spaced-apart support towers of an electrical power transmission network, for ground fault protection from lightning strikes and other electrical faults, with an integral fiber optic telecommunications bundle. It is disclosed a bundle of optical fibers tightly enclosed by a pliable thermally insulating strain jacket is firmly affixed into a helically-wound channel within an electrically conductive core; and at least one layer of stranded electrical conductors serving as strength members completely surrounds the core. It is disclosed the wire can include at least one fiber optic subunit firmly affixed into a helically-wound channel within an electrically conductive core of the cable. It is disclosed the fiber optic subunit includes a plurality of optical fibers wound about a fiberglass central strength member having an overcoating layer of a pliable semicompressible material, and tightly enclosed by a pliable thermally insulating strain jacket.

U.S. Pat. No. 5,495,546 to Bottoms, et al. entitled *Fiber Optic Groundwire With Coated Fiber Enclosures,* disclose an optic static wire assembly including a central core which has one or more helical channels in its periphery. It is disclosed one or more tubes containing a dielectric water-blocking compound and one or more optical fibers are positioned in the channels. It is disclosed the tubes are coated with a thermal insulation material, and then a heat reflective material. It is disclosed the optical fibers are randomly arranged within the tubes in such a way that tensile stresses on the cable are not transmitted to them. It is disclosed the assembly formed by the core and the tube or tubes is wrapped with a serving of metal wires.

U.S. Pat. No. 5,524,164 to Hattori, et al. entitled *Coated Tape Form Optical Fiber Wire,* disclose a tape form optical fiber wire including at least one set of at least two optical fibers each of which has a protective coating layer and which are arranged in parallel in the same plane, at least one set of the optical fibers being integrated by at least one common coating layer, in which the common coating layer contains a main component of a common coating resin and a component having a poor compatibility with the main component.

U.S. Pat. No. 5,787,217 to Traut, et al. entitled *Fiber Optic Ground Wire Cable,* disclose a fiber optic cable core structure that includes a plurality of fiber optic mini-bundles, each of which includes a plurality of optical fibers bonded together in a first curable material. It is disclosed the fiber optic mini-bundles in turn are bonded together as a unitary structure by a second curable material, and the resulting structure is wrapped in a metal tube-like ring.

U.S. Pat. Reissue No. RE032,374 to Dey, et al. entitled *Overhead Electric And Optical Transmission Cables,* disclose a flexible stranded body, such as an electic conductor of an overhead electric transmission or distribution system, including at least one stranded layer of elongate elements of metal or metal alloy, at least one elongate compartment within and extending throughout the length of the stranded body and, loosely housed in the elongate compartment, at least one separate optical fibre and/or at least one optical bundle.

SUMMARY OF THE INVENTION

It is, therefore, an object among other objects of the present invention to provide an optical fiber composite ground wire (OPGW) in which optical fibers inserted into a steel tube are of the same length.

A further object among other objects of the present invention is to provide an optical fiber composite ground wire (OPGW) having an integrated function of a communication line and a ground wire.

To achieve the above objects and other objects of the present invention, there is provided an optical fiber composite ground wire (OPGW). The optical fiber composite ground wire (OPGW) includes a central wire at the center of the optical fiber composite ground wire (OPGW), a steel tube disposed around the central wire, at least one optical fiber ribbon inserted into the steel tube and containing a plurality of optical fibers arranged in a coplanar alignment, a filling material filled in the steel tube, at least one inner layer wire surrounding the central wire, and at least one outer layer wire surrounding the steel tube and the inner layer wire.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of the present invention will be described hereinbelow with reference to the accompanying drawings.

Figure 1A:
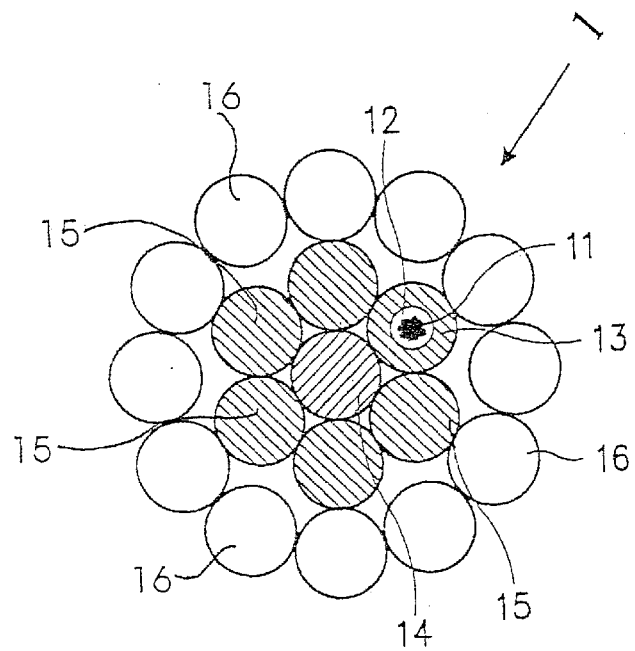
FIG. 1A is a sectional view of an optical fiber composite ground wire (OPGW) with a steel tube exemplary of contemporary practice in the art.
Figure 1B:
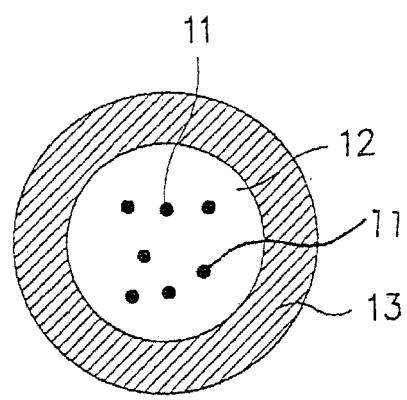
FIG. 1B is a sectional view of the steel tube of FIG. 1A exemplary of contemporary practice in the art.

Referring now to FIGS. 1A and 1B, FIG. 1A is a sectional view of an optical fiber composite ground wire (OPGW) 1 using a steel tube an exemplary of contemporary practice in the art, and FIG. 1B is a detailed sectional view of the steel tube exemplary of contemporary practice in the art illustrated in FIG. 1A. Referring to FIGS. 1A and 1B, the optical fiber composite ground wire (OPGW) 1 exemplary of contemporary practice in the art includes acryl-coated optical fibers 11 having an outer diameter of about 250 μm, a jelly 12 on the circumference of the optical fibers 11, for protecting the optical fibers 11 against water, a steel tube 13 for inserting at least one optical fiber 11 having the jelly 12, a central wire 14, inner layer wires 15 surrounding the central wire 14 and being aluminum-coated steel wires or aluminum wires, and outer layer wires 16 surrounding the inner layer wires 15 and being aluminum-coated steel wires or aluminum wires. The optical fibers 11 are individually inserted into the steel tube 13 and thus can be of different lengths due to application of different tensile forces on the optical fibers 11 in a fabrication process, which can result in deterioration of optical transmission characteristics.

Figure 2A:
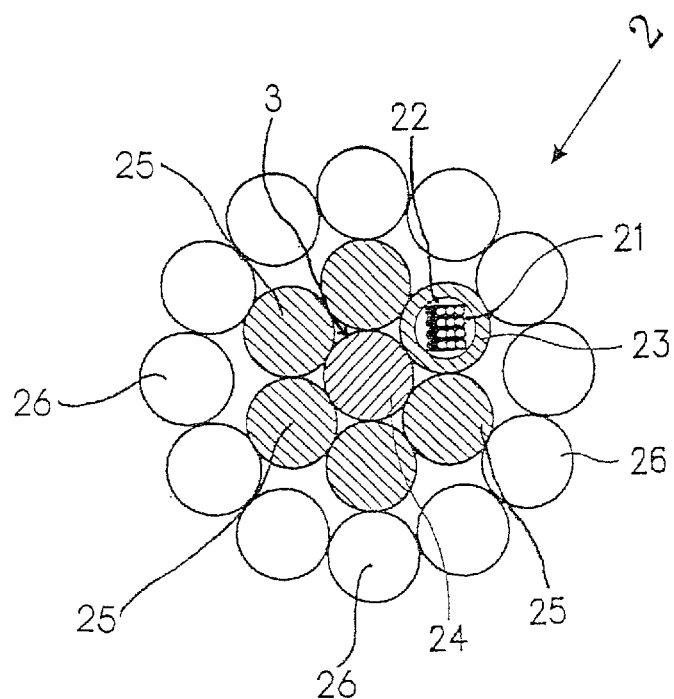
FIG. 2A is sectional view of an optical fiber composite ground wire (OPGW) with a steel tube according to the present invention.
Figure 2B:
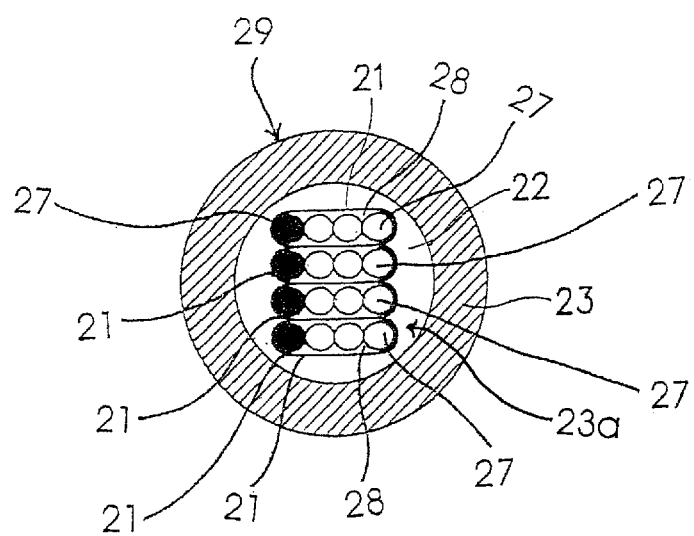
FIG. 2B is a sectional view of the steel tube shown in FIG. 2A illustrating an embodiment according to the present invention.
Figure 2C:
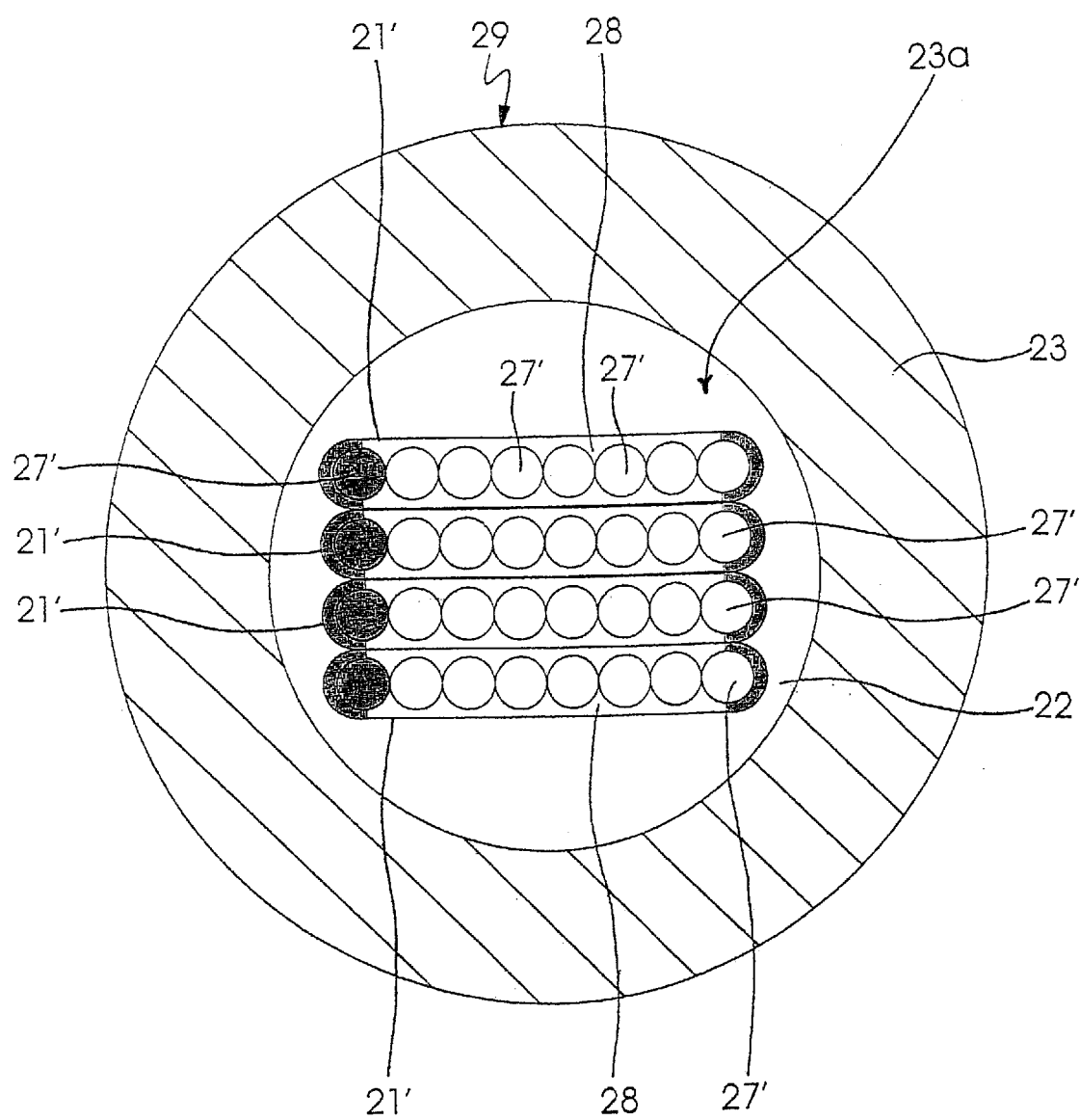
FIG. 2C is a sectional view of the steel tube shown in FIG. 2A illustrating another embodiment of the present invention.

Continuing with reference to FIGS. 2A through 2C, FIG. 2A is a sectional view of an optical fiber composite ground wire (OPGW) 2 with a steel tube according to the present invention, and FIGS. 2B and 2C are a sectional views of the steel tube shown in FIG. 2A according to exemplary embodiments of the present invention. Referring to FIGS. 2A through 2C, the optical fiber composite ground wire (OPGW) 2 includes at least one optical fiber ribbon 21 ((FIG. 2B), 21' (FIG. 2C), a jelly 22, a steel tube 23 for inserting the at least one optical fiber ribbon 21, 21' in the steel tube 23, a central wire 24, inner layer wires 25, and outer layer wires 26.

The at least one optical fiber ribbon 21, 21' is desirably formed by arranging 4 to 8 acryl-coated optical fibers 27 (FIG. 2B), 27' (FIG. 2C) in coplanar alignment as illustrated in FIGS. 2A through 2C, uniformly coating a resin 28 on the outer surfaces of the optical fibers 27, 27', and curing the coated optical fibers 27, 27' with ultra violet (UV) light. The optical fibers 27, 27' perform the function of a communication line or communication lines in the optical fiber composite ground wire (OPGW) 2, such as for remote monitoring or remote control of an electric transmission line, for example. Also, FIG. 2B illustrates a plurality of optical fiber ribbons 21 arranged in a stacked, parallel arrangement, namely four optical fiber ribbons 21 for example, with each optical fiber ribbon having four (4) optical fibers 27 in coplanar alignment, for example. FIG. 2C also illustrates a plurality of optical fiber ribbons 21' arranged in a stacked, parallel arrangement, namely four optical fiber ribbons 21', for example, with each optical fiber ribbon 21' having eight (8) optical fibers 27' in coplanar alignment, for example.

The ultra violet (UV)-curing resin 28 functions to maintain the optical fibers 27, 27' in a coplanar alignment and protect the optical fibers 27, 27' against moisture and external shock. The coatings of resin 28 the optical fibers 27, 27' in the optical fiber ribbon 21, 21' are desirably of different colors to distinguish the optical fibers 27, 27'. The jelly 22 filled in the steel tube 23 prevents moisture from being introduced into the steel tube 23 and facilitates the insertion of the at least one optical fiber ribbon 21, 21' into the steel tube 23. The jelly 22 is desirably a resin material.

Continuing with reference to FIG. 2A through 2C, the steel tube 23 has a central aperture 23a that contains at least one optical fiber ribbon 21 (FIG. 2B), 21' (FIG. 2C) and the jelly 22, and the steel tube 23 is formed of a metal resistant against oxidation and corrosion. Also, tube 23 can be formed of a comparable metal material resistant against oxidation and corrosion. The steel tube 23 is generally formed of a 0.15 to 0.25 mm thick stainless steel and has a diameter of 2 mm. An aluminum layer 29 is coated on the periphery of the steel tube 23 to prevent corrosion possibly generated when the steel tube 23 contacts the outer layer wires 26. At least one optical fiber ribbon 21, 21' with 4 to 8 acryl-coated optical fibers 27, 27' having a diameter of about 250 μm, for example, is inserted into the central aperture 23a of the steel tube 23, and the number of optical fibers 27, 27' can be increased by stacking more optical fiber ribbons 21, 21', such as illustrated in FIGS. 2A through 2C, for example. The jelly 22 is filled into the steel tube 23 together with the optical fiber ribbon 21, 21' to prevent friction between the optical fiber ribbon 21, 21' and the steel tube 23. The steel tube 23 is desirably soldered in a fabrication process to remove pin holes. The optical fibers 27, 27' desirably have a fiber excess length of 0.1 to 0.3% to prevent the deterioration of their optical fiber characteristics, such as caused by expansion and contraction of the steel tube 23.

Again referring to FIGS. 2A through 2C, the central wire 24 is disposed at a center 3 of optical fiber composite ground wire (OPGW) 2 and is desirably an aluminum-coated steel wire or an aluminum wire used as a core wire of the inner layer wires 25. The steel tube 23 desirably has an excess length of 60 mm or more and is disposed around or about the central wire 24 and is disposed radially outward from the central wire 24 and from the center 3 of optical fiber composite ground wire (OPGW) 2 so that the expansion or contraction of the optical fiber composite ground wire (OPGW) 2 does not influence the optical fibers 27, 27'. Also, each of the inner layer wires 25 is desirably at least one aluminum-coated steel wire or an aluminum wire and can be coated with an anticorrosive oil when needed or desirable. Each inner layer wire or wires 25 are desirably disposed about or in surrounding relation to the central wire 24, with the inner layer wire or wires 25 disposed radially outward from the central wire 24 and radially outward from the center 3 of optical fiber composite ground wire (OPGW) 2.

Further, each of the outer layer wires 26 in FIG. 2A is desirably at least one aluminum-coated steel wire or an aluminum wire. The outer layer wire or wires 26 are respectively disposed about or in surrounding relation around the steel tube 23 and the inner layer wire or wires 25, and the outer layer wire or wires 26 are disposed radially outward from the central wire 24 and radially outward from the center 3 of optical fiber composite ground wire (OPGW) 2, and disposed outward from the steel tube 23 and the inner layer wire or wires 25. The outer layer wires 26 perform the function of a ground wire in the optical fiber composite ground wire (OPGW) 2. The outer layer wires 26 provide electrical and mechanical characteristics to the optical fiber composite ground wire (OPGW) 2.

In this regard, the above mentioned electrical characteristics include that the optical fiber composite ground wire (OPGW) 2 performs the function of the ground wire. Since the outermost layer of the optical fiber composite ground wire (OPGW) 2 namely, the outer layer wire or wires 26, have a conductive characteristic, current caused by, for example, lightning can flow through the surface of the outer layer wire or wires 26. Accordingly, the induced current can be grounded. Further, the above mentioned mechanical characteristics include that the outer layer wire or wires 26 have mechanical strength so that the outer layer wire or wires 26 enclose and protect the steel tube 23 which encloses a plurality of optical fibers 27, 27'.

Also, the inner layer wires 25 and the outer layer wires 26 are desirably respectively spliced in opposite directions to prevent their rotation when the optical fiber composite ground wire (OPGW) 2 is installed. Further, the inner layer wires 25 desirably have an excess length smaller than that of the outer layer wires 26.

In accordance with the present invention as described above, an optical fiber ribbon 21, 21' is used as an optical transmission medium inserted into a steel tube 23 in an optical fiber composite ground wire (OPGW) 2. Therefore, the optical fibers 27, 27' in the steel tube 23 are desirably of the same length, the number of the optical fibers 27, 27' advantageously can be easily increased, and discrimination between the optical fibers 27, 27' in the steel tube 23 is advantageously facilitated.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An optical fiber composite ground wire (OPGW), comprising:
   a central wire disposed at a center of said optical fiber composite ground wire (OPGW);
   a steel tube disposed radially outward from said central wire and disposed radially outward from said center of said optical fiber composite ground wire (OPGW), said steel tube having a central aperture;
   an optical fiber ribbon disposed in said central aperture of said steel tube, said optical fiber ribbon including a plurality of optical fibers arranged in a coplanar alignment within said optical fiber ribbon, said plurality of optical fibers each respectively forming a communication line in said optical fiber composite ground wire (OPGW);
   a filling material disposed about said optical fiber ribbon in said central aperture of said steel tube;
   an inner layer wire disposed radially outward from said central wire and disposed radially outward from said center of said optical fiber composite ground wire (OPGW); and
   an outer layer wire disposed outward from said steel tube and from said inner layer wire and disposed radially outward from said center of said optical fiber composite ground wire (OPGW), said outer layer wire forming a ground wire in said optical fiber composite ground wire (OPGW).

2. The optical fiber composite ground wire (OPGW) of claim 1, further comprised of said optical fiber ribbon comprising a plurality of acryl-coated optical fibers in said coplanar alignment, said plurality of acryl-coated optical fibers being uniformly coated with a resin on an outer surface of each of said plurality of acryl-coated optical fibers and cured with ultra violet (UV) light.

3. The optical fiber composite ground wire (OPGW) of claim 1, further comprised of said optical fiber ribbon inserted into said central aperture of said steel tube having a fiber excess length of 0.1% to 0.3%.

4. The optical fiber composite ground wire (OPGW) of claim 1, further comprised of said steel tube being coated with an aluminum layer to prevent corrosion generated when said steel tube is in contact with said outer layer wire.

5. The optical fiber composite ground wire (OPGW) of claim 1, further comprised of said filling material comprising a jelly of a resin material.

6. The optical fiber composite ground wire (OPGW) of claim 1, further comprised each of said central wire and said outer layer wire comprising one of an aluminum-coated steel wire and an aluminum wire.

7. The optical fiber composite ground wire (OPGW) of claim 1, further comprised of said inner layer wire and said outer layer wire being respectively spliced in opposite directions to prevent rotation of said inner layer wire and said outer layer wire during installation of said optical fiber composite ground wire (OPGW).

8. The optical fiber composite ground wire (OPGW) of claim 1, further comprised of said outer layer wire having an excess length larger than that of said inner layer wire.

9. The optical fiber composite ground wire (OPGW) of claim 1, further comprised of:
   said optical fiber ribbon comprising a plurality of acryl-coated optical fibers in said coplanar alignment, said plurality of acryl-coated optical fibers being uniformly coated with a resin on an outer surface of each of said plurality of acryl-coated optical fibers and cured with ultra violet (UV) light; and
   said optical fiber ribbon inserted into said central aperture of said steel tube having a fiber excess length of 0.1 to 0.3%.

10. The optical fiber composite ground wire (OPGW) of claim 1, further comprised of:
    said optical fiber ribbon comprising a plurality of acryl-coated optical fibers in said coplanar alignment, said plurality of acryl-coated optical fibers being uniformly coated with a resin on an outer surface of each of said plurality of acryl-coapted optical fibers and cured with ultra violet (UV) light;

said steel tube being coated with an aluminum layer to prevent corrosion generated when said steel tube is in contact with said outer layer wire; and said central wire and said outer layer wire each comprising one of an aluminum-coated steel wire and an aluminum wire.

11. The optical fiber composite ground wire (OPGW) of claim 10, further comprised of said filling material comprising a jelly of a resin material.

12. The optical fiber composite ground wire (OPGW) of claim 1, further comprised of:

said steel tube being coated with an aluminum layer to prevent corrosion generated when said steel tube is in contact with said outer layer wire; and said central wire and said outer layer wire each comprising one of an aluminum-coated steel wire and an aluminum wire.

13. The optical fiber composite ground wire (OPGW) of claim 12, further comprised of said inner layer wire and said outer layer wire being respectively spliced in opposite directions to prevent rotation of said inner layer wire and said outer layer wire during installation of said optical fiber composite ground wire (OPGW).

14. The optical fiber composite ground wire (OPGW) of claim 12, further comprised of said outer layer wire having an excess length larger than that of said inner layer wire.

15. The optical fiber composite ground wire (OPGW) of claim 1, further comprised of a plurality of optical fiber ribbons disposed in said central aperture of said steel tube, each said optical fiber ribbon of said plurality of optical fiber ribbons including said plurality of optical fibers arranged in said coplanar alignment within a respective said optical fiber ribbon.

16. The optical fiber composite ground wire (OPGW) of claim 15, further comprised of said plurality of optical fiber ribbons being arranged in a stacked, parallel relation in said central aperture of said steel tube.

17. The optical fiber composite ground wire (OPGW) of claim 16, further comprised of said plurality of optical fibers in each said optical fiber ribbon in said plurality of optical fiber ribbons being in a range of from 2 to 8 in number.

18. The optical fiber composite ground wire (OPGW) of claim 15, further comprised of a plurality of inner layer wires, each said inner layer wire of said plurality of inner layer wires being disposed radially outward from said central wire and disposed radially outward from said center of said optical fiber composite ground wire (OPGW), and further comprised of a plurality of outer layer wires, each said outer layer wire of said plurality of outer layer wires being disposed outward from said steel tube and from said plurality of inner layer wires and disposed radially outward from said center of said optical fiber composite ground wire (OPGW), said plurality of outer layer wires each forming a ground wire in said optical fiber composite ground wire (OPGW).

19. The optical fiber composite ground wire (OPGW) of claim 18, further comprised of said steel tube being coated within an aluminum layer to prevent corrosion when said steel tube is in contact with any of said plurality of outer layer wires, and further comprised of each of said central wire and said plurality of outer layer wires comprising one of an aluminum-coated steel wire and an aluminum wire.

20. The optical fiber composite ground wire (OPGW) of claim 18, further comprised of said plurality of inner layer wires and said plurality of outer layer wires being respectively spliced in opposite directions to prevent rotation of said plurality of inner layer wires and said plurality of outer layer wires during installation of said optical fiber composite ground wire (OPGW).

21. The optical fiber composite ground wire (OPGW) as claimed in claim 18, further comprised of said plurality of outer layer wires each having an excess length larger than that of each of said plurality of inner layer wires.

22. The optical fiber composite ground wire (OPGW) as claimed in claim 18, further comprised of each of said plurality of optical fiber ribbons comprising a plurality of acryl-coated optical fibers in said coplanar alignment, said plurality of acryl-coated optical fibers being uniformly coated with a resin on an outer surface of each said plurality of acryl-coated optical fibers and cured with ultra violet (UV) light.

23. The optical fiber composite ground wire (OPGW) as claimed in claim 15, further comprised of each of said plurality of optical fiber ribbons comprising a plurality of acryl-coated optical fibers in said coplanar alignment, said plurality of acryl-coated optical fibers being uniformly coated with a resin on an outer surface of each said plurality of acryl-coated optical fibers and cured with ultra violet (UV) light.

24. The optical fiber composite ground wire (OPGW) as claimed in claim 23, further comprised of each of said plurality of optical fiber ribbons inserted into said central aperture of said steel tube having a fiber excess length of 0.1% to 0.3%.

25. The optical fiber composite ground wire (OPGW) as claimed in claim 24, further comprised of said filling material comprising a jelly of a resin material.

26. The optical fiber composite ground wire (OPGW) as claimed in claim 1, further comprised of said plurality of optical fibers in said optical fiber ribbon being in a range of from 2 to 8 in number.

27. A method of forming an optical fiber composite ground wire (OPGW), comprising the steps of:

disposing a central wire at a center of said optical fiber composite ground wire (OPGW);

disposing a steel tube radially outward from said central wire and radially outward from said center of said optical fiber composite ground wire (OPGW), and providing a central aperture in said steel tube;

disposing an optical fiber ribbon is said central aperture of said steel tube, and arranging a plurality of optical fibers in a coplanar alignment within said optical fiber ribbon, said plurality of optical fibers each respectively forming a communication line in said optical fiber composite ground wire (OPGW);

disposing a filling material about said optical fiber ribbon in said central aperture of said steel tube;

disposing an inner layer wire radially outward from said central wire and radially outward from said center of said optical fiber composite ground wire (OPGW); and disposing an outer layer wire outward from said steel tube and from said inner layer wire and radially outward from said center of said optical fiber composite ground wire (OPGW), said outer layer wire forming a ground wire in said optical fiber composite ground wire (OPGW).

28. The method of claim 27, further comprised of said step of disposing an optical fiber ribbon is comprised of disposing a plurality of optical fiber ribbons in said central aperture of said steel tube, each said optical fiber ribbon of said plurality of optical fiber ribbons including said plurality of optical fibers arranged in said coplanar alignment within a respective said optical fiber ribbon of said plurality of optical fiber ribbons.

29. The method of claim 28, further comprising the step of arranging said plurality of optical fiber ribbons in a stacked, parallel relation in said central aperture of said steel tube.

30. The method claim 28, further comprised of the step of disposing an inner layer wire further comprised of disposing a plurality of inner layer wires, each said inner layer wire of said plurality of inner layer wires being disposed radially outward from said central wire and radially outward from said center of said optical fiber composite ground wire (OPGW), and said step of disposing an outer layer wire further comprised of disposing a plurality of outer layer wires, each said outer layer wire of said plurality of outer layer wires being disposed outward from said steel tube and from said plurality of inner layer wires and radially outward from said center of said optical fiber composite ground wire (OPGW), said plurality of outer layer wires each forming a ground wire in said optical fiber composite ground wire (OPGW).

31. The method of claim 30, further comprised of forming each of said plurality of optical fiber ribbons by arranging a plurality acryl-coated optical fibers in said coplanar alignment within a respective said optical fiber ribbon and uniformly coating with a resin on the outer surface of each of said plurality of acryl-coated optical fibers of each said optical fiber ribbon and curing said plurality of acryl-coated optical fibers coated with said resin of each said optical fiber ribbon with ultra viloet (UV) light.

32. The method of claim 27, further comprising forming said optical fiber ribbon of a plurality of acryl-coated optical fibers in said coplanar alignment and uniformly coating said plurality of acryl-coated optical fibers with a resin on an outer surface of each of said plurality of acryl-coated fibers and curing said plurality of acryl-coated optical fibers coated with said resin with ultra violet (UV) light.

33. The method of claims 27, further comprised of forming said optical fiber ribbon to have a fiber excess length of 0.1% to 0.3%.

34. The method of claim of 27, further comprised of splicing said inner layer wire and splicing said outer layer wire respectively in opposite directions to prevent rotation of said inner layer wire and said outer layer wire during installation of said optical fiber composite ground wire (OPGW).

35. The method of claim 27, further comprised of forming said outer layer wire to have excess length larger than that of said inner layer wire.

36. The method of claim 27, further comprised of:
coating said steel tube with an aluminum layer to prevent corrosion generated when said steel tube is in contact with said outer layer wire;
forming each of said central wire and said outer layer wire of one of an aluminum-coated steel wire and an aluminum wire; and providing a jelly of a resin material as said filling material.

37. An optical fiber composite ground wire (OPGW), comprising:
a central wire disposed at a center of said optical fiber composite ground wire (OPGW);
a tube disposed radially outward from said central wire and disposed radially outward from said center of said optical fiber composite ground wire (OPGW), said tube having a central aperture, said tube being comprised of a metal material resistant to oxidation and to corrosion;
an optical fiber ribbon disposed in said central aperture of said tube, said optical fiber ribbon including a plurality of optical fibers arranged in a coplanar alignment within said optical fiber ribbon, said plurality of optical fibers each respectively forming a communication line in said optical fiber composite ground wire (OPGW);
a filling material disposed about said optical fiber ribbon in said central aperture of said tube;
an inner layer wire disposed radially outward from said central wire and disposed radially outward from said center of said optical fiber composite ground wire (OPGW); and
an outer layer wire disposed outward from said tube and from said inner layer wire and disposed radially outward from said center of said optical fiber composite ground wire (OPGW), said outer layer wire forming a ground wire in said optical fiber composite ground wire (OPGW).

38. A method of forming an optical fiber composite ground wire (OPGW), comprising the steps of:
disposing a central wire at a center of said optical fiber composite ground wire (OPGW);
disposing a tube radially outward from said central wire and radially outward from said center of said optical fiber composite ground wire (OPGW), and providing a central aperture in said tube, said tube being comprised of a metal material resistant to oxidation and to corrosion;
disposing an optical fiber ribbon is said central aperture of said steel tube, and arranging a plurality of optical fibers in a coplanar alignment within said optical fiber ribbon, said plurality of optical fibers each respectively forming a communication line in said optical fiber composite ground wire (OPGW);
disposing a filling material about said optical fiber ribbon in said central aperture of said tube;
disposing an inner layer wire radially outward from said central wire and radially outward from said center of said optical fiber composite ground wire (OPGW); and
disposing an outer layer wire outward from said tube and from said inner layer wire and radially outward from said center of said optical fiber composite ground wire (OPGW), said outer layer wire forming a ground wire in said optical fiber composite ground wire (OPGW).

* * * * *